(12) United States Patent
Larson et al.

(10) Patent No.: US 7,136,728 B2
(45) Date of Patent: Nov. 14, 2006

(54) COMPUTERIZED WHEEL ALIGNMENT SYSTEM WITH IMPROVED STABILITY AND SERVICEABILITY

(75) Inventors: Timothy A. Larson, Ferguson, MO (US); John K. Korte, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 330 days.

(21) Appl. No.: 10/827,773

(22) Filed: Apr. 20, 2004

(65) Prior Publication Data

US 2004/0210362 A1     Oct. 21, 2004

Related U.S. Application Data

(60) Provisional application No. 60/464,311, filed on Apr. 21, 2003.

(51) Int. Cl.
*G06F 7/00* (2006.01)
*G01B 11/26* (2006.01)

(52) U.S. Cl. ........................ 701/29; 701/36; 280/86.75; 356/153

(58) Field of Classification Search ............ 701/29–34, 701/36; 356/139.09, 155, 153, 139.03, 150; 280/86.75
See application file for complete search history.

(56) References Cited

U.S. PATENT DOCUMENTS

| 6,285,932 B1 | 9/2001 | De Bellefeuille et al. |
| 6,370,455 B1 | 4/2002 | Larson et al. |
| 6,405,111 B1 * | 6/2002 | Rogers et al. ............... 701/33 |
| 6,442,460 B1 * | 8/2002 | Larson et al. ............... 701/33 |

* cited by examiner

*Primary Examiner*—Y. Beaulieu
(74) *Attorney, Agent, or Firm*—Polster, Lieder, Woodruff, & Lucchesi, L.C.

(57) ABSTRACT

An improved vehicle wheel alignment system includes at least one sensing device for acquiring automotive data, interface circuitry in communication with the sensing device for generating data representative of automotive data acquired by the sensing device, and a computer in communication with the interface circuitry. The computer is configured with an operating system adapted to provides one or more vehicle service or vehicle wheel alignment software applications with a protected operating environment, and which facilitates remote updating and servicing of the vehicle wheel alignment system.

25 Claims, 2 Drawing Sheets

COMPUTERIZED WHEEL ALIGNMENT SYSTEM WITH IMPROVED STABILITY AND SERVICEABILITY

CROSS-REFERENCE TO RELATED APPLICATIONS

The present invention is related to, and claims priority from U.S. Provisional Patent Application No. 60/464,311 filed on Apr. 21, 2003, herein incorporated by reference.

STATEMENT REGARDING FEDERALLY SPONSORED RESEARCH

Not Applicable.

BACKGROUND OF THE INVENTION

The present invention relates to automotive service equipment, and more particularly to computerized vehicle wheel alignment systems configured to provide a dependable and reliable computing environment for one or more vehicle service or wheel alignment software applications, and which facilitate remote updating and servicing of the vehicle wheel alignment system.

It is desirable that a computer associated with an automotive diagnostic or service system such as a vehicle wheel alignment system be compatible with local and global computer networks, such as the Internet, to exchange information with remote computers and databases. For example, the vehicle wheel alignment systems set forth and described in U.S. Pat. No. 6,370,455 B1 to Larson, herein incorporated by reference, facilitate compatibility with local and global computer networks. Computing products suitable for implementation of vehicle wheel alignment systems having Internet access include, but are not limited to, desk-top computers, laptop computers, tablet-type computers, wearable computers, and pocket-type computers, each of which is a form factor suitable for use in an automotive repair shop environment.

Computers included in traditional vehicle wheel alignment systems may provide limited access to a network of computers (e.g., LAN) and to the Internet, but generally do not integrate the Internet into associated automotive service, maintenance, repair or inspection software, such as wheel alignment applications. Instead, the computer operates in a traditional manner, configured to browse the Internet without fully integrating the Internet into the vehicle wheel alignment software applications to utilize the availability of remote access and information exchange.

Using conventional technologies means it is very difficult to guarantee a single, unified infrastructure. There is no guarantee that the remote service (i.e. software module) with which the vehicle wheel alignment system needs to communicate with at the remote system will have the proper infrastructure, i.e. it might have been modified for use with a different operating system, object model, or updated with a new programming language, resulting in an incompatibility between the vehicle wheel alignment system and the remote system.

Service-orientated computer systems, such as those utilizing ONC RPC, DCE, COM, CORBA, RMI, and JINI™ protocols, generally require special protocols for communications. For example, a COM client must use the COM protocols to communicate with a COM service. A JINI™ client must use the JINI™ protocols to communicate with a JINI™ service. Such special communications protocols are not common on the Internet, and firewalls disposed in the data communications pathway between the vehicle wheel alignment system and the remote computer may routinely block the communication.

In a service shop environment, automotive vehicle service computers are commonly used to run applications for the maintenance of vehicles. An example of such an application is a wheel alignment application. The wheel alignment application runs on the automotive vehicle service computer and communicates with one or more sensors to determine the alignment condition of a vehicle. The sensors may include a variety of direct angle measurement sensors, or may include one or more cameras configured to obtain images of objects such as targets, from which alignment angles can be determined. The wheel alignment application will commonly run within an operating system that is resident on the vehicle service computer. The operating system is responsible for managing the resources of the computer such as the memory, hard drive, keyboard, mouse, and disk files. The operating system provides a computing environment in which the wheel alignment application can communicate with the sensors, display alignment results, and accept input from the user.

Hunter Engineering Company manufactures a wheel alignment system known as the 611 Series alignment console. The 611 Series alignment console utilizes a vehicle service computer that runs a WinAlign™ alignment software application within a Microsoft Windows-98™ operating system. The Windows-98 operating system provides the essential resource management that is required for the WinAlign™ software application to function properly. However, the Microsoft Windows-98™ operating system does not provide the robustness, serviceability, and reliability desired by operators of vehicle service equipment.

When problems occurr with the alignment software application running on Microsoft Windows-98™ and other earlier operating systems, a trained technician is often required to service or maintain the vehicle service system computer. The technician may visit the shop and attempt to determine the source of the problem. The technician may look for problems with the operating system and incompatibilities between the various software applications, device drivers, and devices such as sensors or input components that were attached to the vehicle service system computer. If the technician can not determine the cause of the problem, the technician often needs to completely reinstall the operating system and the vehicle service or alignment software applications. A complete reinstallation of the operating system and various software applications is a time consuming process which risks significant data loss. In addition, any settings or customizations which have been added to the vehicle service system since the initial installation of the operating system and each software application will be lost, requiring additional time and expense to fully restore the vehicle service system to a desired configuration.

Conventional computer-based vehicle service and wheel alignment system required a trained technician to configure and maintain the installed software and hardware components. The technician is required to understand challenging personal computer concepts in order to maintain the computer system. For example, to configure a network of computers with traditional operating systems, the technician is required to understand the configuration of TCP/IP networks.

Accordingly, there is a need for vehicle wheel alignment systems and vehicle service systems in general, which employ computers configured to simplify setup procedures and to guide technicians through the process of configuring a network and other system settings without the need for specialized skills or training, and which facilitate servicing and repair of software applications associated with the vehicle service system such as a vehicle wheel alignment system.

BRIEF SUMMARY OF THE INVENTION

Briefly stated, an embodiment of the apparatus of the present invention is of an improved wheel alignment system which includes at least one sensing device for acquiring automotive data such as an alignment angle measurement or an image from which an alignment angle measurement can be obtained, sensor interface circuitry in communication with the sensing device for generating data representative of automotive data acquired by the sensing device, and a computer in communication with the sensor interface circuitry. The computer is configured with a data storage, a memory, and a central processing unit to provide one or more vehicle service or vehicle wheel alignment software applications with a protected operating environment. The computer is further configured with a communications interface and communications applications capable of communicating with a data network to facilitate remote updating and servicing of the software components and applications of the vehicle service or vehicle wheel alignment system.

In an alternate embodiment of the apparatus of the present invention, an improved vehicle wheel alignment system includes at least one sensing device for acquiring automotive data such as an alignment angle measurement or an image from which an alignment angle measurement can be obtained, sensor interface circuitry in communication with the sensing device for generating data representative of automotive data acquired by the sensing device, and a computer having a data storage, a memory, and a central processor, in communication with the sensor interface circuitry. The computer is configured with at least one vehicle wheel alignment software application and with a software application adapted to facilitate periodic storage of system data in a protected data storage to provide one or more system restoration points. The system data includes sufficient operating system data, software application data, and system settings to enable a complete restoration of the vehicle wheel alignment system configuration to a configuration corresponding at a selected system restoration point.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
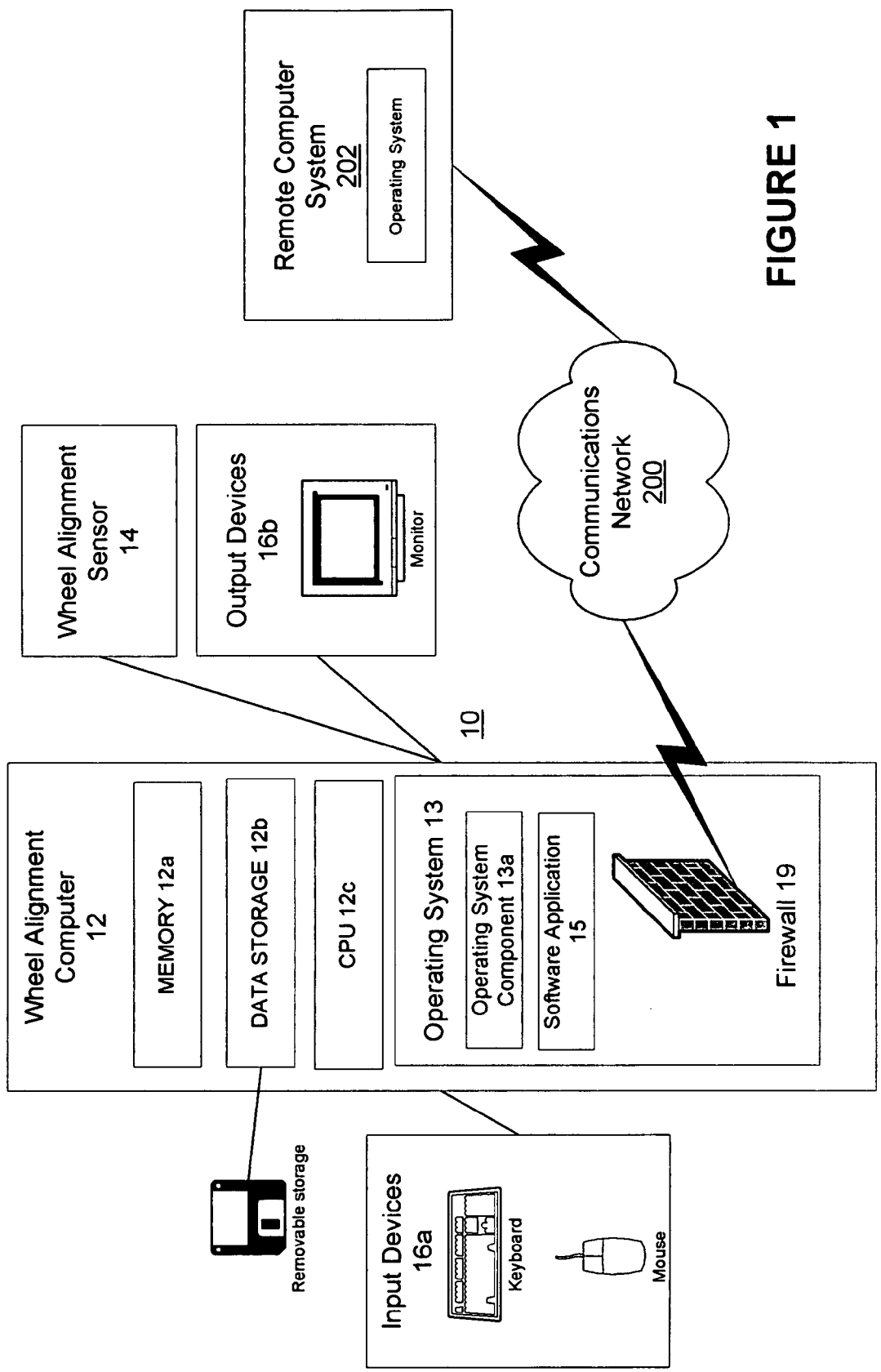
FIG. 1 is a block diagram of a vehicle wheel alignment system of the present invention linked via a communications network to a remote service computer.
Figure 2:
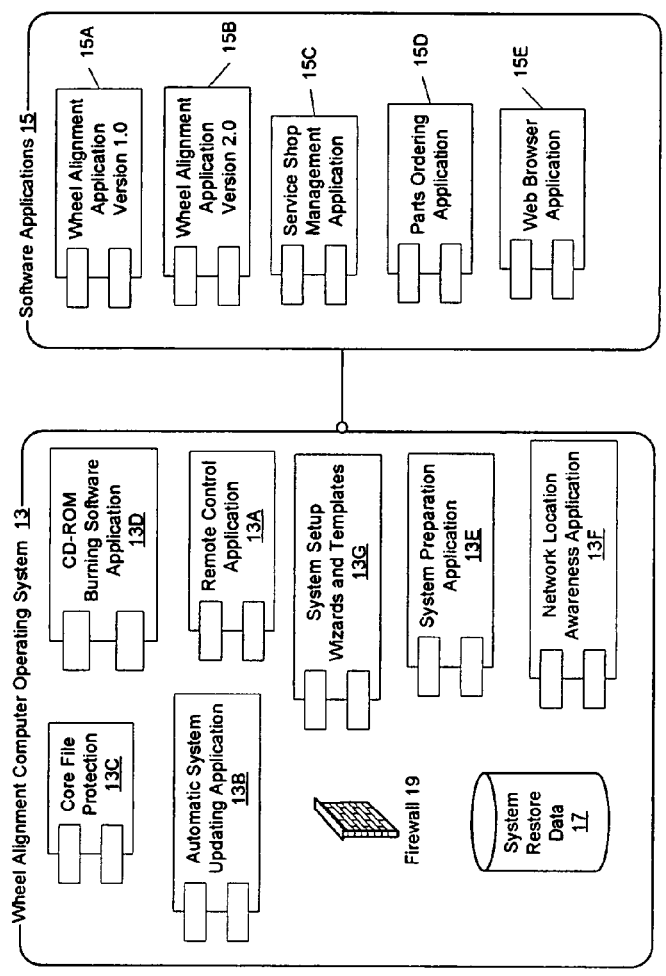
FIG. 2 is a block diagram of the operating system components and software applications of a vehicle wheel alignment system of the present invention.

Turning to FIGS. 1 and 2, an improved vehicle wheel alignment system of the present invention is shown generally at 10. The vehicle wheel alignment system 10 includes at least one computer 12 having a memory 12*a*, a data storage 12*b*, and a central processing unit 12*c*. The computer 12 is configured with a software operating system 13 and at least one vehicle service software application, indicated generally at 15. The software operating system 13 and software applications 15 may be resident in the memory 12*a*, data storage 12*b*, and CPU 12*c* as is conventional for the operation of computer operating systems and software applications.

As is shown in FIG. 2, the vehicle service software applications may include, but are not limited to, one or more versions of a wheel alignment software application 15A and 15B, a service shop management software application 15C, a replacement part ordering software application 15D, or other applications such as a web browser application 15E. The computer 12 is preferably a general purpose computer, but optionally is any computing device used with systems of complexity similar to that of a vehicle wheel alignment system. For example, a micro-processor, a micro-controller, graphics signal processor, or a digital signal processor having sufficient computing power to carry out calculations required for a vehicle service procedure and to assist an operator in servicing a vehicle.

Coupled to the computer 12 are one or more wheel alignment sensors 14 utilized to carry out the one or more specific vehicle service functions for which the vehicle wheel alignment system 10 is adapted, as well as one or more conventional data input devices 16*a* such as a mouse, a keyboard, or input buttons. Preferably, one or more output devices 16*b* are coupled to the computer 12 to provide an operator with a display of visual or audible information. An output device 16*b* may be an speaker, or may be a LED readout configured to display alpha-numeric information, a liquid crystal display (LCD), a cathode-ray tube (CRT) display, or any other conventional visual display device adapted to provide a visual display of information to an operator. Optionally, an output device 16*b* is configured with a touch-screen interface, to present the operator with a graphical user interface to the operating system and vehicle service software applications 15 operating on the computer 12.

Those of ordinary skill in the art will recognize that one or more additional standard components optionally may be operatively coupled to the computer 12, such as, but not limited to, removable data storage devices, printers, and communication interfaces (i.e. local area networks, Internet connections, an 802.11 transceiver, a Bluetooth transceiver, an infrared port, a USB port, or a 1394 FireWire), within the scope of the present invention.

In the preferred embodiment of the present invention, vehicle wheel alignment computer 12 is configured with a 32-bit or higher operating system 13 consisting of a plurality of operating system components. The operating system preferably provides a fully protected memory model capable of isolating individual operating system components 13A–13F and software applications, programs, or modules 15A–15D. In the event an error occurs in an operating system component 13A–13F or software application, program, or module 15A–15D, the fully protected memory model isolates the component, application, program, or module from other functioning operating system components, software programs, applications or modules currently active in the vehicle wheel alignment computer 12, thereby reducing the chances of a general system failure.

In an alternate embodiment of the present invention, the operating system 13 with which the vehicle wheel alignment computer 12 is configured is the Microsoft Windows-XP™ operating system. The Microsoft Windows-XP™ operating system provides a 32-bit computing architecture, and a fully protected memory model. An additional version of the Microsoft Windows-XP™ operating system provides a 64-bit computing architecture, and a fully protected memory model.

Traditionally, restoring a vehicle wheel alignment computer 12 to a working condition following a general system failure often required a lengthy process of completely reformatting the associated data storage 12b and restoring the operating system software 13, together with any associated vehicle service software applications 15, system settings, and customizations. The reformatting of the associated data storage 12b or hard drive, and software restoration resulted in the complete loss of all previously stored data, system settings, and customization.

Figure 3:
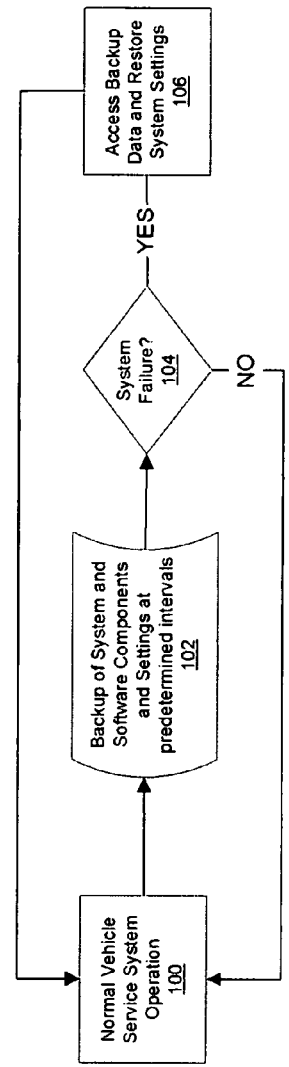
FIG. 3 is a flow-chart illustrating the periodic system backup and restoration functionality of a vehicle wheel alignment system of the present invention.

As shown in FIG. 3, to facilitate a system restoration of the vehicle wheel alignment computer 12 of the present invention in the event of a general system failure, the vehicle wheel alignment computer 12, during normal operation (Box 100), is configured to generate a backup 17 of critical operating system and software application restoration data in a sequential and periodic manner (Box 102), providing an operator with identifiable system restoration points in the event of a general system failure. The critical operating system and software application restoration data store 17 may include, but is not limited to, operating system parameters and variables, installed software application operating parameters and variables, wheel alignment system hardware configuration variables, and network configuration variables. Preferably, the backup 17 is maintained in a protected partition of the data storage 12b, generally not accessible by the operating system 13 or software applications 15 for other uses. Alternatively, the backup 17 may be maintained in a removable data storage device, such as a CD-R or on a remote computer system operatively coupled to the vehicle wheel alignment system 12. Following identification of a system failure or other need to restore the vehicle wheel alignment system 12 to a previous configuration (Box 104), the operating system 13 and associated vehicle service software applications 15 are selectively restored to configurations identified by one of the previously stored system restoration points (Box 106), thereby limiting the loss of data and the reducing the need to reconfigure the vehicle wheel alignment system 12 after restoration.

An optional method to facilitate a system restoration of the vehicle wheel alignment computer 12 of the present invention in the event of a system failure maintains a backup 17 of all initial settings, operating system components, and software applications, preferably in a protected partition of the data store 12b. Alternatively, the backup 17 is maintained on a removable storage media such as CD-R/RW, DVD-R/RW, a hard disk storage device, flash drive, memory card, SD media, or similar device.

To provide a protected partition on the data store 12b, the data store 12b is structured with two partitions, a main or working partition, and a recovery partition. The main or working partition contains the operating system components, current settings, and installed software applications, and is accessed during normal operations (Box 100) of the vehicle wheel alignment computer 12. The protected recovery partition is hidden from normal user access and contains one or more "images" of the operating system components, settings, and installed software applications, as captured at discrete intervals, or as directed by an operator. For example, prior to installing a new software application in the vehicle wheel alignment system 12, an operator may direct the operating system 13 to generate a backup 17 of the current operating system 13, software applications 15, and settings, to protect against the chance of corruption by the installation of the new software application.

In the event that the main partition becomes unusable due to corruption, the wheel alignment computer 12 is configured to provide a simple operator interface permitting the backup 17 on the recovery partition to be accessed and copied to the main partition of the data storage 12b. The interface is preferably provided by an operating system component 13, but may optionally be provided by a software application 15. Once the contents of the recovery partition are copied to the main partition of the data storage 12b, the vehicle wheel alignment computer 12 is restored to the previously stored operating state including all settings customized for, or by, the operator.

Optionally, the backup 17 stored on the recovery partition of the data storage 12b may be compressed using one or more conventional data compression algorithms to reduce the amount of data storage 12b space required to be dedicated to the recovery partition. This restoration method is quicker and easier than re-installing the operating system 13, individual software applications 15, and customized settings using traditional installation methods. Examples of software applications 15 that may optionally be utilized to facilitate such a image recovery solution are Easy Restore by PowerQuest, Drive Image by PowerQuest, Ghost by Symantec, and PC Angel software by Softthinks.

The operating system 13 is preferably configured as an "embedded" operating system, but may optionally be configured as a standard, data storage installed operating system. When configured as an embedded operating system, the operating system 13 is loaded and run on the vehicle wheel alignment computer 12 from an operatively coupled external storage device, such as a CD-ROM drive or a DVD drive. By supporting the ability to load and run from an external storage device, the operating system 13 can be serviced in the field by replacing the media used with the associated external storage device, eliminating the lengthy and sometimes error prone installation process of loading or replacing operating system components 13 on a data storage 12b with new or updated operating system components 13.

Preferably, the vehicle wheel alignment computer 12 is configured with one or more communication software components, such as a remote control application 13A, and associated communications interfaces through which a service technician can remotely access or control the vehicle wheel alignment computer 12 over a communications network 200 from a remote computer system 202. Utilizing the remote control software component 13A, a technician at a remote location can identify and solve problems arising with the wheel alignment computer 12 more quickly and less expensively, reducing the need to travel to individual locations.

The vehicle wheel alignment computer 12 is configured to require less "in person" maintenance by service technicians by incorporating an automatic update system component 13B into the operating system 13. As application compatibility updates, new device drivers, and other updates are developed for the operating system 13, they are provided on a accessible remote service computer 202. The automatic update system component 13B of the vehicle wheel alignment computer 12 automatically downloads the updated operating system components in the background when an operator links the vehicle wheel alignment computer 12 to a communications network 200 in communication with the remote service computer 202. By accommodating automatic updates, the vehicle wheel alignment computer 12 and automatic update system 13B reduce the need for "in person" maintenance and service. Alternatively, functionality of the automatic update system component 13B of the operating system may be provided by a software application 15 which is separate from the operating system 13.

Within the vehicle wheel alignment computer 12, allocation of the available memory is controlled by the operating system 13 to isolate individual software applications 15 and operating system components. In the event of a failure in one software application 15 associated with the vehicle wheel alignment system 10, other software applications 15 residing or running on the vehicle wheel alignment computer 12 are isolated from the failed application, reducing the chances of a cascading failures, leading to a general system failure. Allocation of the available memory in the vehicle wheel alignment computer 12 is preferably controlled to permit multiple versions of individual software components 15 to be installed and run "side by side" without interfering with each other This feature allows differing versions of vehicle alignment software applications 15A, 15B to reside on the vehicle wheel alignment computer 12 and to be run simultaneously.

The vehicle wheel alignment computer 12 is preferably configured with a file protection application 13C to prevent critical operating system files from being accidentally overwritten or deleted. If a critical operating system file is overwritten, the file protection application 13C identify the missing or damaged system file, and restores the correct version from the protected backup 17. This feature protects critical operating system files from accidental corruption or deletion.

Preferably, the wheel alignment computer 12 includes an integrated firewall 19 configured to protect the vehicle wheel alignment computer 12 from unauthorized access or intrusions via the communications network 200. Conventionally, when a vehicle service computer 12 is connected to a communications network, the vehicle service computer 12 is at risk to corruption from "attacks" from unauthorized users over the communications network 200. Incorporation of a firewall 19 into the operating system 13, or as a separate software application 15 reduces the risk of an unauthorized access or intrusion into the vehicle wheel alignment computer 12 through the communications network 200.

Preferably, the vehicle wheel alignment computer 12 and operating system 13 provide a wide range of hardware support, including support for the Universal Serial Bus (USB) 2.0 standard that allows faster communication with external devices 14, 16.

Support for CD-ROM burning through a software application 13D within the operating system 13 permits software applications 15 resident in the wheel alignment computer 12 to directly provide data backups to CD-R/RW media without requiring additional specialized CD-R/RW burning software applications.

Preferably, the operating system 13 of the vehicle alignment computer 12 includes a system preparation operating system component 13E. The system preparation operating system component is configured to provide system administrators with the ability to "clone" or duplicate the vehicle alignment computer configurations, operating systems, and software applications for use on other vehicle wheel alignment computers 12. A single record, "image", or backup 17 which stores all necessary operating system information, software application information, and system settings is maintained in a secure partition of the data storage 12b. The "image" can be restored to, or installed on, multiple vehicle wheel alignment computers 12. By using the system preparation operating system component 13E, multiple vehicle wheel alignment computers 12 can be maintained from a single location over the communications network 200 instead of requiring an individual installation or procedure to be physically repeated at each vehicle service computer 12.

Preferably, the vehicle service computer 12 is configured with a network location awareness operating system component. The network location awareness operating system component 13F permits the vehicle service computer 12 to be operatively coupled to different communication networks without the need for a manual reconfiguration of the associated communication network parameters and settings. Changing operating system settings required a skilled service technician with knowledge of TCP/IP networking or other suitable communications protocols.

Preferably, the vehicle service computer 12 includes one or more setup wizard operating system components 13G, such as a communication network setup wizard. Communication network setup wizard operating system components 13G are configured to guide a user through key steps, such as sharing files and printers, sharing the communication network connection, and configuring the system firewall 19. Using the wizard operating system components 13G, vehicle wheel alignment computers 12 can be connected to a communications network 200, such as the Internet, more easily than those configured with earlier operating systems requiring knowledge of TCP/IP networking protocol.

Portions of the present invention can be embodied in the form of computer-implemented processes and apparatuses for practicing those processes. Portions of the present invention can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An improved vehicle wheel alignment system including at least one sensor for acquiring automotive data, interface circuitry in communication with the sensing device for generating data representative of automotive data acquired by the sensing device, and a computer system having a central processor in communication with a memory, a data storage, and the interface circuitry, the improvement comprising:

the computer system configured with a plurality of software applications, said plurality of software applications including at least one vehicle wheel alignment software application;

the computer system configured with an operating system having a plurality of operating system components, said operating system establishing for each of said plurality of software applications, a discrete protected operating environment wherein interaction between each of said plurality of software applications is controlled by said operating system;

said computer system further configured to receive data from the at least one sensor device through the interface circuitry, and to provide said data to at least said vehicle wheel alignment software application, and wherein vehicle wheel alignment software applications is configured to utilize said received data to generate a representation of at least one vehicle wheel alignment angle for display to an operator.

2. The improved vehicle wheel alignment system of claim 1 wherein the computer system is configured with a restoration software application adapted to establish at least one backup corresponding to a system restoration point representative of a current state of said computer system, said operating system, and said plurality of software applications, each system restoration point including sufficient information to restore said computer system, said operating system, and said plurality of software applications to said current state at a subsequent time.

3. The improved vehicle wheel alignment system of claim 2 wherein said restoration software application is adapted to provide an operator interface to said at least one backup, whereby an operator may selectively restore one or more components of said computer system, said operating system, and said plurality of software applications to said current state.

4. The improved vehicle wheel alignment system of claim 2 wherein said at least one backup is stored in a protected partition of the vehicle wheel alignment system data storage.

5. The improved vehicle wheel alignment system of claim 2 wherein said at least one backup is stored in an external data storage.

6. The improved vehicle wheel alignment system of claim 2 wherein said at least one backup is stored in a remote system data storage operatively coupled to the computer system through a communications network.

7. The improved vehicle wheel alignment system of claim 1 wherein at least one of said plurality of operating system components generates at least one backup corresponding to a system restoration point representative of a current state of said computer system, said operating system, and plurality of software applications, each system restoration point including sufficient information to restore said computer system, said operating system, and said plurality of software applications to said current state at a subsequent time.

8. The improved vehicle wheel alignment system of claim 7 wherein said operating system component provides an operator interface to said at least one backup, whereby an operator may selectively restore one or more components of said computer system, said operating system, and said plurality of software applications to said current state.

9. The improved vehicle wheel alignment system of claim 1 wherein said plurality of software applications include at least two versions of said vehicle wheel alignment software application; and wherein said computer system is configured with said operating system to enable simultaneous operation of each of said at least two versions.

10. The improved vehicle wheel alignment system of claim 1 wherein said computer system is operatively coupled to a communications network; and wherein said computer system is configured with a software application to periodically identify availability of, and to obtain if available, one or more operating system components, software applications, or system settings through said communications network for subsequent installation.

11. The improved vehicle wheel alignment system of claim 1 wherein said computer system is configured with a software application to create a system configuration image of said operating system, said plurality of software applications, and one or more current system settings;

wherein said system configuration image includes information required for duplicating said operating system, said plurality of software applications, and said one or more current system settings on one or more additional vehicle wheel alignment systems.

12. The improved vehicle wheel alignment system of claim 1 wherein at least one of said plurality of operating system components is adapted to create a system configuration image of said operating system, said plurality of software applications, and one or more current system settings;

wherein said system configuration image includes information required for duplicating said operating system, said plurality of software applications, and said one or more current system settings on one or more additional vehicle wheel alignment systems.

13. The improved wheel alignment system of claim 1 wherein said computer system is configured with a software application to receive operating instructions from a second computer over a communications network operatively coupled to said computer system.

14. The improved vehicle wheel alignment system of claim 1 wherein said computer system is configured with a software application to guide an operator with a display of one or more predetermined steps required to complete a predetermined setup procedure selected from a set of setup procedures including, but not limited to, adding a hardware component to the system, installing a software application, or coupling the system to a communications network.

15. The improved vehicle wheel alignment system of claim 1 wherein said computer system is configured with a software application to facilitate remote diagnostics of the vehicle wheel alignment system, said remote diagnostics optionally including one or more procedures selected from a set of procedures including installation of new software applications, installation of updated software applications, and deletion of one or more software applications.

16. The improved vehicle wheel alignment system of claim 1 wherein said computer system is configured with a Microsoft Windows-XP family operating system.

17. The improved vehicle wheel alignment system of claim 1 wherein the computer system is further configured with a protected store of data containing system restoration information representative of an initial configuration of said computer system, said operating system, and each of said plurality of software applications, said store of data including sufficient information to enable restoration of said computer system, said operating system, and each of said plurality of software applications to said initial state.

18. The improved vehicle wheel alignment system of claim 17 wherein at least one of said plurality of operating system components is a restoration component configured to selectively access said protected store of data to retrieve data, said restoration component further configured to utilize said retrieved data to restore one or more elements of the system to said initial state.

19. The improved vehicle wheel alignment system of claim 1 wherein at least one of said plurality of operating system components is a file protection component configured to prevent unintended replacement or deletion of one or more data files in the data storage.

20. The improved vehicle wheel alignment system of claim 1 wherein said computer system is further configured with at least one external data storage device; and
wherein said operating system is an embedded operating system stored in said at least one external data storage device.

21. The improved vehicle wheel alignment system of claim 1 wherein at least one of said plurality of operating system components is a network awareness component for detection of the connection of a communications network to said computer, and for automatically configuring said computer system for communications with said detected communications network.

22. An improved vehicle wheel alignment system including at least one sensor for acquiring automotive data, interface circuitry in communication with the sensing device for generating data representative of automotive data acquired by the sensing device, and a computer system having a central processor in communication with a memory, a data storage, and the interface circuitry, the improvement comprising:
the computer system configured with a plurality of software applications, said plurality of software applications including
(a) at least one vehicle wheel alignment software application, and
(b) at least one restoration software application for establishing at least one backup corresponding to a system restoration point representative of a current state of said computer system and said plurality of software applications, each system restoration point including sufficient information to subsequently restore said computer system and said plurality of software applications to a state corresponding to said current state of said system restoration point;
said computer system further configured to receive data from the at least one sensor device through the interface circuitry, and to provide said data to at least said vehicle wheel alignment software application, and
wherein vehicle wheel alignment software applications is configured to utilize said received data to generate a representation of at least one vehicle wheel alignment angle for display to an operator.

23. An improved vehicle wheel alignment system including at least one sensor for acquiring automotive data, interface circuitry in communication with the sensing device for generating data representative of automotive data acquired by the sensing device, and a computer system having a central processor in communication with a memory, a data storage, the interface circuitry, and a communications network the improvement comprising:
the computer system configured with a plurality of software components, said plurality of software components including
(a) at least one vehicle wheel alignment software component, and
(b) at least one software component for enabling the computer system to be controlled from a remote computer system in communication with the computer system through the communications network;
said computer further configured to receive data from the at least one sensor device through the interface circuitry, and to provide said data to at least said vehicle wheel alignment software application, and
wherein vehicle wheel alignment software applications is configured to utilize said received data to generate a representation of at least one vehicle wheel alignment angle for display to an operator.

24. An improved vehicle wheel alignment system including at least one sensor for acquiring automotive data, interface circuitry in communication with the sensing device for generating data representative of automotive data acquired by the sensing device, and a computer system having a central processor in communication with a memory, a data storage, the interface circuitry, and a communications network the improvement comprising:
the computer system configured with a plurality of software components, said plurality of software components including
(a) at least one vehicle wheel alignment software component, and
(b) a firewall software component enabling authorized communications with the computer system through the communications network;
said computer system further configured to receive data from the at least one sensor device through the interface circuitry, and to provide said data to at least said vehicle wheel alignment software application, and
wherein vehicle wheel alignment software applications is configured to utilize said received data to generate a representation of at least one vehicle wheel alignment angle for display to an operator.

25. The improved vehicle wheel alignment system of claim 24 wherein said computer system is further configured with a software operating system and wherein said firewall software component is an operating system component.

* * * * *